F. B. JEWETT & T. SHAW.
CASE FOR LOADING COILS.
APPLICATION FILED NOV. 10, 1910.
1,100,018.
Patented June 16, 1914.
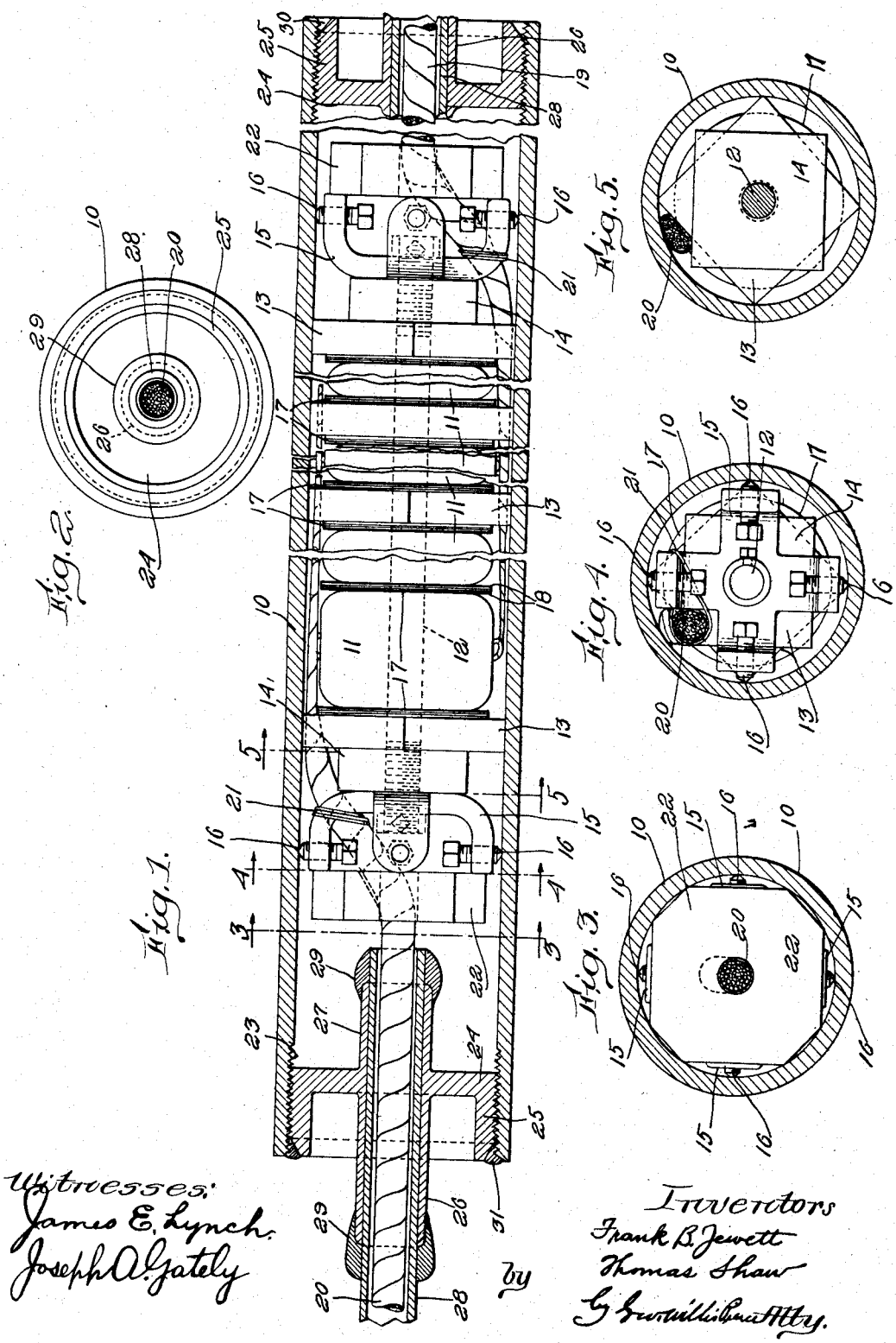

UNITED STATES PATENT OFFICE.

FRANK B. JEWETT, OF WYOMING, AND THOMAS SHAW, OF HACKENSACK, NEW JERSEY, ASSIGNORS TO AMERICAN TELEPHONE AND TELEGRAPH COMPANY, A CORPORATION OF NEW YORK.

CASE FOR LOADING COILS.

1,100,018.   Specification of Letters Patent.   Patented June 16, 1914.

Application filed November 10, 1910. Serial No. 591,603.

*To all whom it may concern:*

Be it known that we, FRANK B. JEWETT and THOMAS SHAW, residing at Wyoming and Hackensack, in the counties of Essex and Bergen and State of New Jersey, respectively, have invented certain Improvements in Cases for Loading Coils, of which the following is a specification.

Our invention is directed to cases for the loading coils of telephone lines, and particularly to those adapted for use in submarine cables. Its chief object is to provide such a device which may be applied conveniently to a cable and hermetically sealed.

In the accompanying drawings forming a part of this specification, and in which similar characters of reference are applied to like elements throughout, Figure 1 is a central longitudinal section through one embodiment of the invention, parts being broken away; Fig. 2 is an end elevation thereof, and Figs. 3, 4 and 5 are transverse sections on the lines 3—3, 4—4 and 5—5, respectively, of Fig. 1.

The numeral 10 designates a case or container, preferably in the form of a continuous tube, extra heavy wrought iron pipe being suitable for this purpose. Within the case are the loading coils 11 of the usual toroidal form, situated side by side with their axes substantially coinciding with axis of the case. They may be mounted upon a wooden spindle 12 centered in the case by wooden blocks 13; and secured against displacement longitudinally of the case by wooden nuts 14 threaded upon the ends of the spindle, and by metal spiders 15 abutting against the nuts and having through their arms set-screws 16 engaging the case. Iron washers 17 are placed on each side of the coils insulated therefrom by fiber washers 18.

From each coil extend the terminal conductors by means of which said coil is connected in series with the line it is to load. These conductors, which to distinguish them may be called the east and west terminals, are gathered in two sets consisting of all the east and west terminals, respectively, and formed into two short stub cables 19 and 20. These, as illustrated, pass outside the coils, blocks and washers and through the corresponding, or east and west, extremities of the case. The stub cables may be maintained in position by binding them at 21 to arms of the spiders, and by carrying them through central openings in supporting blocks 22 inserted in the case just outside the spiders. When the coils are in place, one extremity of the case is temporarily plugged a short distance from the end and the interior is filled with some such solidifying insulating compound as rosin-rosin-oil, this surrounding the coils and extending nearly to the opposite extremity of the case.

The inner ends of the case are each threaded at 23 to engage a cup-like screw plug or head 24, having a depression formed between a cylindrical flange or rim 25 and a nipple or short tube 26 surrounding an axial opening through the head and extending outside the depression. The tube is continued into the case by an extension 27, this permitting the exit from the case of the terminal cable at each end. Each cable has a comparatively loose section 28 of lead sheath, which extends through tube 26 and projects just inside and for a considerable distance outside the tube.

When the assembling of the case and its coils is to be completed, a metal seal is provided at every juncture between metal parts. To accomplish this, the sheath section 28 is first placed in position in the tube of each head and soldered thereto by wiped joints indicated at 29. Then the terminal cable is drawn through the sheath and tube and the head screwed into place, with the edge of the flange substantially flush with the edge of the case. The adjacent angles of the case and flange have been previously beveled to furnish a groove 30, and along this line these elements are welded, conveniently by an oxy-acetylene flame. A strip of Norway iron is fused in to fill the groove, as shown at 31 in connection with one of the heads. The threaded engagement gives strength to this joint and the weld adds strength and a hermetical seal. To prevent the intense heat of the welding from injuring the cable and the contents of the case, a water-jacket is preferably employed outside and inside the weld during the operation, and the depression in the head is useful in forming a portion of this jacket. The wiped joints 29 are spaced from the welded joints by the comparatively long nipples, thus reducing the injurious effect of the heat upon the wiped joints. The coils are now incased in unbroken metal, save for the space between the cables 19 and 20 and their sheaths. After utilizing these spaces to test the integrity of the joint by creating through them a vacuum in the chambers left in the case beyond the coils, said chambers and sheath spaces are completely filled by forcing in a suitable insulating compound, as Bermúdez asphalt. This having been done, the coils and case are ready for insertion between sections of a submarine or other cable, the terminal cable 19 being connected in a suitable manner to one section and the cable 20 to the other section.

We claim as our invention, and desire to secure by Letters Patent:

1. The combination with a tubular case, of a plurality of loading coils situated therein, and two terminal cables each including one set of terminals of the coils, said cables extending from the case through its opposite ends and said combination of parts constituting a unitary incased coil structure adapted for connection between cable ends by joining the latter to the projecting terminal cables respectively.

2. The combination with a tubular case, of a plurality of loading coils situated therein, two terminal cables each including one set of terminals of the coils, said cables extending from the case through its opposite ends, a loose sheath section for each terminal cable, and means for sealing the juncture between the sheath sections and case.

3. The combination with a tubular case, of a plurality of loading coils situated therein, and two terminal cables each including one set of terminals for all of the coils, said cables extending between the outside of the coils and the case and through the opposite ends of said case.

In testimony whereof, we have signed our names to this specification in the presence of two subscribing witnesses, this second day of November, 1910.

FRANK B. JEWETT.
THOMAS SHAW.

Witnesses:
W. M. GOULD,
R. S. SUTLIFFE.

---

Copies of this patent may be obtained for five cents each, by addressing the "Commissioner of Patents, Washington, D. C."